(12) United States Patent
Thorel

(10) Patent No.: US 7,927,757 B2
(45) Date of Patent: Apr. 19, 2011

(54) HIGH TEMPERATURE FUEL CELL WITH MIXED ANIONIC AND PROTONIC CONDUCTION

(75) Inventor: Alain Thorel, Saint-Vrain (FR)

(73) Assignee: Armines, Paris (FR)

( * ) Notice: Subject to any disclaimer, the term of this patent is extended or adjusted under 35 U.S.C. 154(b) by 769 days.

(21) Appl. No.: 11/886,493

(22) PCT Filed: Mar. 17, 2006

(86) PCT No.: PCT/FR2006/050235
§ 371 (c)(1),
(2), (4) Date: Jan. 11, 2008

(87) PCT Pub. No.: WO2006/097663
PCT Pub. Date: Sep. 21, 2006

(65) Prior Publication Data
US 2008/0213639 A1    Sep. 4, 2008

(30) Foreign Application Priority Data
Mar. 17, 2005    (FR) ...................................... 05 50696

(51) Int. Cl.
*H01M 8/06* (2006.01)
*H01M 8/10* (2006.01)
(52) U.S. Cl. ............. 429/491; 429/9; 429/495; 429/496
(58) Field of Classification Search .................. 429/491, 429/9
See application file for complete search history.

(56) References Cited

U.S. PATENT DOCUMENTS

| 4,722,873 A | 2/1988 | Matsumura et al. |
| 6,013,386 A | 1/2000 | Lewin et al. |
| 2002/0031695 A1 | 3/2002 | Smotkin |
| 2004/0072039 A1 | 4/2004 | Jankowski et al. |
| 2005/0271924 A1 * | 12/2005 | Coors et al. ..................... 429/34 |

FOREIGN PATENT DOCUMENTS

| EP | 1 170 812 | 1/2002 |
| JP | 7130382 | 5/1995 |
| JP | 2005302064 | 10/2005 |

OTHER PUBLICATIONS

Moussaoui et al., "Co-ion leakage through bipolar membranes Influence on I-V responses and water-splitting efficiency," *Journal of Membrane Science*, 90(3):283-292 (1994).

Xu, "Ion exchange membranes: State of their development and perspective," *Journal of Membrane Science*, 263:1-29 (2005).

* cited by examiner

*Primary Examiner* — Patrick Ryan
*Assistant Examiner* — Brent Thomas
(74) *Attorney, Agent, or Firm* — Patterson Thuente Christensen Pedersen, P.A.

(57) ABSTRACT

This invention concerns a high temperature fuel cell with mixed anionic and protonic conduction having a protonic conduction reforming membrane directly coupled to a solid oxide fuel cell with conduction by oxygen ions, enabling use of a gradually reforming anode generating carbon deposits to be avoided. The reverse operation of the present invention outside the reforming stage forms a high water temperature electrolyser to produce hydrogen efficiently without having to separate it from water as is the case with current systems.

10 Claims, 2 Drawing Sheets

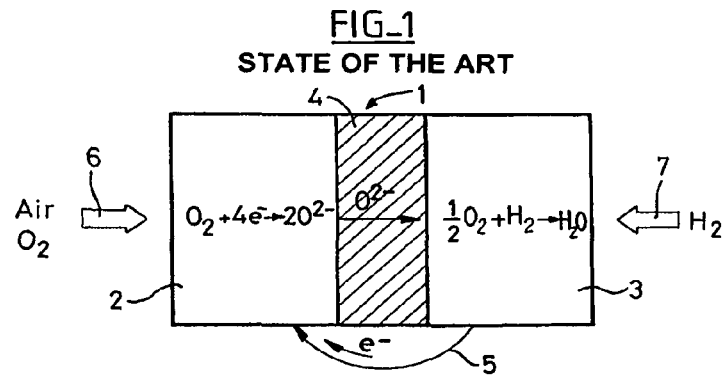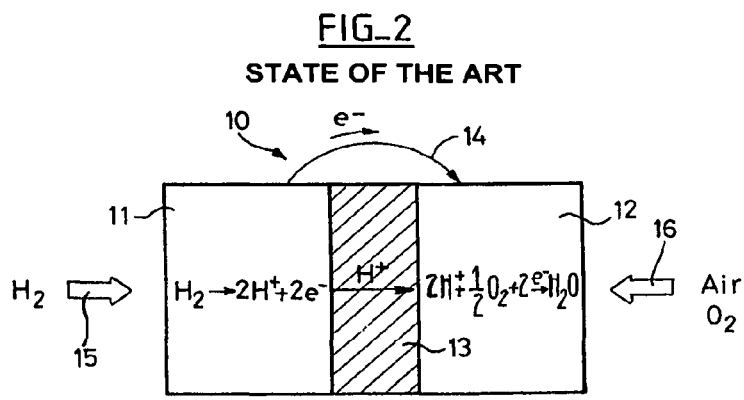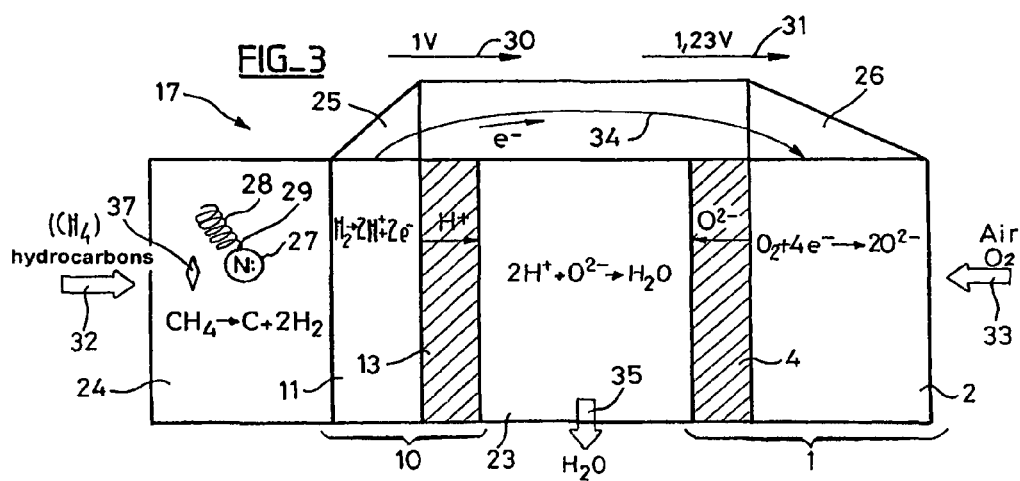

FIG_4
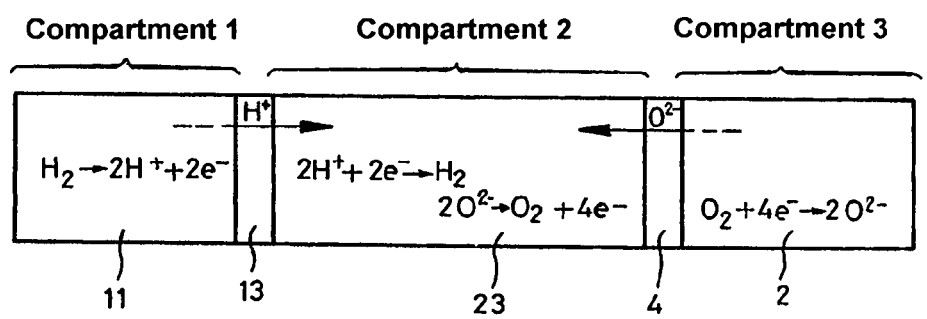

HIGH TEMPERATURE FUEL CELL WITH MIXED ANIONIC AND PROTONIC CONDUCTION

RELATED APPLICATIONS

This application claims priority to PCT Application No. PCT/FR2006/050235 filed Mar. 17, 2007, and French Application No. 0550696 filed Mar. 17, 2005 the disclosures of which are hereby incorporated by reference in their entirety.

FIELD OF THE INVENTION

The technical field of the present invention is that of fuel cells and high temperature electrolysers

BACKGROUND OF THE INVENTION

There are known anionic type fuel cells 1 or Solid Oxide Fuel Cell shown in FIG. 1. These cells 1 are comprised of a cathode 2 and an anode 3 connected together through an electrolyte 4. These cells 1 create a current 5 going from the electron-emitting anode 3 to the electron-receiving cathode 2.

To this end, air or oxygen 6 is conveyed to the cathode 2. Said cathode 2 transforms the oxygen of the air into O2− ions. Said O2− ions then flow through the electrolyte 4 to the anode 3. Said O2− ions recombine with hydrogen at the anode 3 to form water after releasing electrons. As oxygen molecules capture then free electrons and the electrolyte 4 is not an electronic conductor, the current 5 is created in the anode cell 3 to the cathode 2 following a path external to the electrolyte 4.

There are also known protonic type fuel cells 10 or Protonic Ceramic Fuel Cell shown in FIG. 2. Said cells 10 are comprised of an anode 11 and a cathode 12 connected to one another by an electrolyte 13. Said cells 10 create an electron current 14 from the anode 11 to the cathode 12.

To this end, hydrogen is conveyed to the anode 11. Said anode 11 then transforms the hydrogen into H+ ions. Said H+ ions flow through the electrolyte 13 to the cathode 12. Said H+ions recombine with oxygen at the cathode 12 to form water after capturing electrons. As the hydrogen molecules capture then free electrons and the electrolyte 13 is not an electronic conductor, the current 14 is created at the anode cell 11 to the cathode 12 following a path external to the electrolyte 13.

SUMMARY OF THE INVENTION

The invention provides combining both cells 1 and 10 in order that the O2− anions produced by the anionic cell and the H+ protons produced by the protonic cell combine with one another to form water.

To this end, in the invention, the anode of the anionic cell is removed and the cathode of the protonic cell and the electrolytes of these cells are connected together through a porous bonding layer enabling the recombination of H+ ions and the O2− ions to form water. In addition, a reforming membrane is used for the production of hydrogen.

More precisely, the invention results from the coupling of a protonic conduction reforming and hydrogen separation membrane and an oxygen-ion conducting solid oxide fuel cell conventional cell, rather than using a progressive reforming anode that is difficult to work out and for which the problem of carbon deposit has not been resolved so far.

The reforming membrane is composed of a nanodiamonds mesoporous material having a catalytic function. (For example, Ni particles) coupled to a protonically conducting oxide separation membrane (for example, BaCeO3, BaZrO3 or SrCeO3 compounds). The prior art shows that the properties of a catalyst carrier in nanodiamonds are excellent. Associated to a conventional catalyst (for example nickel particles), the reforming reaction of methane for example may be catalyzed from 600° C. instead of the usual 700° C. to 750° C., due to a very good management of the carbon-containing wastes which grow in filament form near to the nickel particles without poisoning the active sites of said nickel particles.

Hydrogen of excellent quality can thus be produced then filtered by being transformed into protons through the associated protonic membrane. H+ Protons thus arrive directly on the coupled SOFC, leading to a maximum efficiency. On the other hand, a "conventional" SOFC cell transforms the oxygen of the air into O2− ions (for example, cathode into LSM+YSZ or cerine/gadolinium) that advances through the electrolyte (for example into YSZ or into gadolinium/cerine composite).

The bonding layer between the "conventional" SOFC electrolyte and the protonic separation membrane is a porous composite made on the one hand of protonic oxide (for example BaCeO3 or SrCeO3) and on the other hand, of an anionic oxide (for example, YSZ or gadolinium/cerine). These two phases should percolate in a highly porous unit. The function carried out by this layer is the recombination between the H+ coming from the post reforming separation membrane and the O2− arriving directly from the electrolyte of the <<conventional>> SOFC. The water thus produced is evacuated by the porosity of the bonding layer.

The advantages of the cell according to the invention are as follows:

No appearance of water at the electrodes (in the static state, the water neutralizes, the active sites in the classic systems, requiring a dynamic gas flux to the electrodes). Since water is created and evacuated at the central composite porous membrane where the $2H^+ + O^{2-} \rightarrow H_2O$ reaction is carried out In-situ direct reforming at 600° C. and non penalizing management of carbon deposits on the facets of nanodiamonds;

No carbon deposit at the SOFC anode

Global addition of the electrochemical potentials of the reactions:

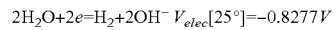

$2H_2O + 2e = H_2 + 2OH^-$  $V_{elec}[25°] = -0.8277V$

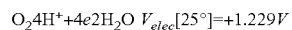

$O_2 4H^+ + 4e 2H_2O$  $V_{elec}[25°] = +1.229V$

At 25° C., the global electrochemical potential across the complete cell is about (1.229+0.8277) V, which is more than 2V instead of 1.23 V for an SOFC alone. The calculation is precisely detailed in FIG. 4.

Possibility of using the natural gas distribution network and thus eliminating the storage and transport problems of hydrogen while supplying excellent quality hydrogen to the SOFC The hydrogen is produced "on demand" since the propelling force is directly linked to the recombination of oxygen and hydrogen ions.

The separation of the hydrogen being the result of a physical process not of a steric one as in the nanoporous membranes, it is not necessary to have a partial high hydrogen pressure upstream.

Thermal coherence between the reforming membrane and the SOFC that both function at 600-700° C.

BRIEF DESCRIPTION OF THE DRAWINGS

The invention will be better understood when reading the following description and on examining the accompanying figures. These figures are only given by way of illustration and example, and are not to be taken by way of limitation of the invention. These figures show:

FIG. 1 (already described): a schematic description of an anionic type fuel cell;

FIG. 2 (already described): a schematic description of a protonic type fuel cell;

FIG. 3: a schematic description of an anionic type fuel cell according to the invention;

FIG. 4: a detailed schematic representation of the different reactions taking place inside the cell according to the invention.

Like components retain the same numerals from one figure to the other.

DETAILED DESCRIPTION OF THE INVENTION

FIG. 3 shows a cell 17 according to the invention in which the electrode 2 and the electrolyte 4 of the cell 1 are connected to the electrode 11 and to the electrolyte 13 of the cell 10 through a bonding layer 23 made of a porous composite material likely to be the seat of a recombination between H+ protons and the O2− anions.

More precisely, the electrode 11 ensuring the transformation of the hydrogen into H+ ions is connected to the electrolyte 13 ensuring the transport of these H+ ions. The electrode 11 is made of mixed conduction porous protonic ceramic and is likely to conduct the H+ions and the electrons. Said electrode 11 is for example of doped SrCeO3, BaZrO3 or in BaCeO3 or in cermet "Protonic Ceramic/Metal (for example SrCeO3/Ni or BaCeO3/Ni)" and has a high density of reaction points, that is, a lot of solid/pores interfaces to allow a good efficiency of the hydrogen transformation in H+ ions.

The electrolyte 13 is made of non electronically conducting dense protonic ceramic, for example of undoped SrCeO3, BaZrO3 or BaCeO3. Said electrolyte 13 allows for the separation of the hydrogen and the transfer of the H+ ions of the electrode 11 to the bonding layer 23.

In addition, the electrode 2 ensuring the transformation of oxygen into O2− ions is connected to the electrolyte 4 ensuring the transport of these O2− ions. The electrode 2 ensures a mixed conduction of the O2− ions and of the electrons captured by the oxygen. To that effect, the electrode 2 is made of a mixed conductor in an oxidizing medium, for example, of LSM (LaSrMn).

The electrode 4 is made of yttria stabilized zirconia (ZrO2/Y2O3) or of non electronically conducting CeO2. This electrolyte 4 ensures the transfer of the O2− ions of the electrode 4 to the bonding layer 23.

The bonding layer 23 is positioned between the electrolyte 13 and the electrolyte 4. This layer 23 is made of a porous composite including a protonic oxide, for example, BaCeO3, BaZrO3 or SrCeO3 to ensure the displacement of the H+ ions and an anionic oxide, for example, YSZ or cerine/gadolinium to ensure the displacement of the O2− anions. The ionic, protonic and porous networks percolate which means that they are sufficiently dense to ensure the displacement of the H+ protons, of the O2− anions and the evacuation of the water inside the bonding layer 23. To ensure this percolation of the networks, we have to ensure that the layer 23 has at least 30% of anionic oxide, at least 30% protonic oxide and at least 30% of pores, within a spherical morphology of the components of the layer 23.

In addition, a reforming membrane 24 ensuring the methane transformation CH4 into hydrogen is in contact with the electrode 11. This membrane 24 helps to produce hydrogen directly from methane. This system avoids the problematic storage of hydrogen.

To that effect, this membrane 24 is notably the seat of the following reactions:

$$CH4 \rightarrow C+2H2 \tag{1}$$

$$H2O+CO \rightarrow CO2+H2 \tag{2}$$

$$2CO \leftarrow \rightarrow CO2+C \tag{3}$$

$$C+H2O \rightarrow CO+H2 \tag{4}$$

The membrane 24 is porous and nickel-based in order to favor the transformation of methane into hydrogen (reaction (1). The membrane further includes nanodiamonds 37 the sizes of which range from 5 and 30 nm. These nanodiamonds 37 help to avoid the formation of a monolayer of carbon around the particles of nickel that would generate a reduction of the efficiency of the cell.

To that effect, the nanodiamonds 37 trap the carbon atoms 28 in filamentary form in a zone close to the particles 27 of Ni. The carbons atoms 28 thus accumulate on one another and form nanotubes around the particles of Ni, the bases 29 of these cylinders being hooked on a face of the nickel 27 particles.

The nanodiamonds used can be obtained from the grinding of non-exploitable diamonds as precious stone or by hydrocarbon detonation in an under pressure, high temperature enclosure.

Alternatively, the membrane 24 transforms another hydrocarbon into hydrogen. Alternatively, the cell 17 does not have a membrane 27 and is fed by a distinct source of hydrogen.

An electron collector 25 in contact with the electrode 11 and an electron distributor 26 in contact with the electrode 2 ensure the circulation of the electrons from the electrodes 11 (the anode) to the electrode 2 (the cathode).

During the functioning of the cell 17 according to the invention, a hydrocarbon such as methane CH4 is transported to the membrane 24 that dissolves it in order to produce among other things the H2 hydrogen. This H2 hydrogen is then transformed into H+ ions by the anode 11, as the electrons are liberated by the hydrogen in order to achieve this transformation. The H+ ions move towards the bonding layer 23 via the electrolyte 11. Thus, the electrode 11 and the electrolyte 13 filter the hydrogen generated by the reforming membrane 24 and only the H+ ions reach the bonding layer 23.

In addition, air or oxygen 33 is transported to the cathode 2 that transforms this oxygen into O2− oxygen ions, electrons being captured by the O2− oxygen molecules in order to achieve this transformation. The O2− ions are then transferred to the bonding layer 23 via the electrolyte 4. These O2− ions and the H+ ions are associated to form water inside the bonding layer 23. The water formed is evacuated by the pores of this layer 23 following a path 35

As the freed electrons at the anode 11 compensate the captured electrons at the cathode 2, and the electrolytes 4 and 13 are not electronic conductors, the current 34 is created from the collector to the electron distributor following a path external to the electrolytes.

After some time of use (some hundreds to thousands of hours), the elements of carbon are burnt under oxidizing atmosphere without exceeding a temperature whereat the nanodiamonds dissolve (700° C.), said elements being trapped thanks to nanodiamonds 37 in order to regenerate the reforming membrane 24.

The cell 17 globally has a potential difference equal to the sum of the potential differences (30 and 31) of the cells 1 and 10 taken separately, being 2.3V as shown below. Compared to cell 1, it requires approximately twice as less cells to make a 220 V. cell. The fuel cell according to the invention functions at a temperature ranging from about 500° C. to 800° C.

FIG. 4 shows the detail of the equations taking place at the electrode 11 (compartment 1), of the bonding layer 23 (compartment 2) and the electrode 2 (compartment 3).

In an open circuit, it is possible to establish the equilibria at the interfaces between the electrodes and the bonding layer. Before detailing the equations, we should define the expressions of the electrochemical potentials ($\tilde{\mu}$) of the species based on the chemical ($\mu$) and electrical ($\phi$) potentials:

$$\tilde{\mu}_{X^{n-}} = \mu_{X^{n-}} - nF\phi^{ES}$$

$$\tilde{\mu}_{X_n} = \mu_{X_n}$$

At each interface, the electrochemical potentials of the species in balance are equal. In the case of the interface between the electrode 11 (compartment 1 for the index) and the layer 23 (compartment 2 for the index) of the protonic membrane, we obtain the following equations:

$$\tilde{\mu}_{H_2}^1 = 2\tilde{\mu}_{H^+}^{ES,1} + 2\tilde{\mu}_{e^-}^1$$

$$2\tilde{\mu}_{H^+}^{ES,2} + 2\tilde{\mu}_{e^-}^2 = \tilde{\mu}_{H_2}^2$$

In the case of the interface between the layer 23 (compartment 2 for the index) and the electrode 2 (compartment 3 for the index) of the anionic membrane, we obtain the following equations:

$$\tilde{\mu}_{O_2}^2 = 2\tilde{\mu}_{O^{2-}}^{ES,2} + 4\tilde{\mu}_{e^-}^2$$

$$2\tilde{\mu}_{O^{2-}}^{ES,3} + 4\tilde{\mu}_{e^-}^3 = \tilde{\mu}_{O_2}^3$$

A special feature of the ionic solid electrolytes is that the concentration in load carriers is identical in the entire volume of the material when the material is at equilibrium. As a result, the chemical potentials of the conductor species are also equal:

$$\mu_{H^+}^{ES,1} = \mu_{H^+}^{ES,2}$$

$$\mu_{O^{2-}}^{ES,2} = \mu_{O^{2-}}^{ES,3}$$

$$\mu_{e^-}^1 = \mu_{e^-}^2$$

Voltage at the Protonic Membrane Terminals:

$$\begin{cases} \mu_{H_2}^1 = 2\mu_{H^+}^{ES,1} + 2F\varphi^{ES,1} + 2\mu_{e^-}^1 - 2F\varphi^1 \\ 2\mu_{H^+}^{ES,2} + 2F\varphi^{ES,2} + 2\mu_{e^-}^2 - 2F\varphi^2 = \mu_{H_2}^2 \end{cases}$$

$$\Rightarrow \mu_{H_2}^1 - \mu_{H_2}^2 = 2F(\varphi^{ES,1} - \varphi^{ES,2}) + 2(\mu_{e^-}^1 - \mu_{e^-}^2) - 2F(\varphi^1 - \varphi^2)$$

The chemical potential of a gas is linked to its partial pressure:

$$\mu_{H_2} = \mu_{0,H_2} + RT\ln\frac{p_1}{p_0}$$

Using this expression, we can connect the potential difference at the terminals of a membrane to the difference of partial gaseous pressure in each compartment at either side of the membrane:

$$\varphi^1 - \varphi^2 = -\frac{RT}{2F}\ln\frac{p_{H_2,1}}{p_{H_2,2}}$$

Voltage at the Anionic Membrane Terminals:
By applying the same reasoning as the prior one, we obtain:

$$\varphi^3 - \varphi^2 = \frac{RT}{4F}\ln\frac{p_{O_2,3}}{p_{O_2,2}}$$

By fixing values of partial oxygen pressures in the order of 0.2 bar in the "rich" compartments and $10^{-18}$ in the "poor" compartments, the total potential difference can be calculated. For realistic values of the partial pressures (like those used in the SOFC calculations), a potential difference equal to 2,4V is found at the terminals of this protonic and anionic mixed membrane, which is twice higher than the tension at the terminals of an SOFC or a PCFC. As compared to these cells, for an equivalent voltage and current density a stack will be twice as less cumbersome.

The functioning of the cell 17 is reversible. Actually, if we consider a cell 17 without reforming membrane 24 and a current is applied on it, this cell being supplied with water, hydrogen and oxygen can be obtained.

More precisely, if an electric current is imposed from the electrode 2 to the electrode 11, the cell then functions backwards and becomes a high temperature electrolyser.

In this case, water is pumped to the bonding layer 23. As the bonding layer 23 protonic ceramic has water dissociation catalytic properties, H+ protons and O2− anions are formed in the bonding layer 23.

The protons formed in the bonding layer 23 advance through the electrolyte 13 to the layer 11 which then becomes the cathode of the system, and within which the H+ protons capture electrons to form H2 hydrogen.

On the other hand, the O2− anions formed in the bonding layer 23 advance through the electrolyte 4 to the cathode 2 which then becomes the anode of the system and within which the O2− ions release electrons to form O2 oxygen.

Such a system is innovating as compared to the present electrolyzing systems because it enables total separation between on the one hand the water and on the other hand the hydrogen and lastly the oxygen.

Indeed, an electrolyser made up of an SOFC functioning backwards produces oxygen at the anode and a mixture of water and hydrogen at the cathode that will have to be filtered later to obtain hydrogen. Yet, a mixture of H2/H2O at high temperature is delicate to manipulate. With the invention, the filtering of hydrogen is not necessary, as the hydrogen obtained is separated from the water.

In addition, an electrolyser made of a PCFC functioning backwards produces hydrogen at the cathode and a mixture of water and oxygen at the anode. Yet a mixture of H2O/O2 at high temperature is highly corrosive for the electric connectors of such a system. There is no such corrosive mixture with the invention; the oxygen obtained being separated from the water.

While the invention is amenable to various modifications and alternative forms, specifics thereof have been shown by way of example in the figures and have been described in detail. It should be understood, however, that the intention is not to limit the invention to the particular embodiments described. On the contrary, the intention is to cover all modifications, equivalents and alternatives.

The invention claimed is:

1. A high temperature fuel cell comprising:
a first cell formed by an anode and a first protonic conduction ceramic electrolyte in contact with one another,
a second cell SOFC type, formed by a cathode and a second anionic conduction ceramic electrolyte in contact with one another, and
a bonding layer positioned between the first and the second electrolyte, this bonding layer ensuring a union between the first and the second electrolyte,
this bonding layer being based on a porous material and having three phases comprising:
a protonic oxide phase comprising $BaCeO_3$, or $BaZrO_3$ or $SrCeO_3$;
an anionic conduction oxide phase comprising YSZ or cerine/gadolinium composite; and
a porous phase for water evacuation,
these three phases percolating in the bonding layer,
said bonding layer playing the role of cathode for the first cell and the role of anode for the second cell.

2. A fuel cell according to claim 1, wherein the bonding layer contains at least 30% of protonic oxide, at least 30% of ionic oxide and at least 30% of porous material.

3. A fuel cell according to claim 1, it further comprising:
a reforming membrane in contact with the anode, said membrane transforming a hydrocarbon into hydrogen, said membrane being made of nickel and including nanodiamonds, said nanodiamonds making it possible to trap carbon particles that appear during the transformation of the hydrocarbon, said carbon being trapped under filamentary form near the nickel particles.

4. A fuel cell according to claim 3, wherein the nanodiamonds have a size ranging from 5 to 30 nm.

5. A fuel cell according to claim 1, wherein the anode is doped with heterovalent cations so as to be a mixed conductor of H+ protons and electrons, said anode being made of $BaCeO_3$, or $SrCeO_3$ or $BaZrO_3$ or cermet.

6. A fuel cell according to one of the claim 1, wherein the first protonic conduction ceramic electrolyte is a non-electronically conducting dense protonic ceramic based on undoped $SrCeO_3$, $BaZrO_3$ or $BaCeO_3$.

7. A fuel cell according to claim 1, wherein the cathode is a mixed conductor in an LMS-based oxidizing medium, said cathode conducting O2− oxygen ions and of electrons.

8. A fuel cell according to claim 1, wherein, the second anionic conduction ceramic electrolyte is based on yttria-stabilized zirconia ($ZrO_2/Y_2O_3$) or of cerine and is a O2− ions conductor but a non electronic conductor.

9. A fuel cell according to claim 1, comprising:
a combination of an anionic cell and a protonic cell, the anionic cell and the protonic cell being respectively deprived of anode and cathode, electrolytes of these cells being linked through a bonded layer which enables the recombination of O2− ions generated by the anionic cell and H+ ions generated by the protonic cell to form water.

10. An electrolyser utilizing the fuel cell of claim 1.

* * * * *